(12) United States Patent
Kim et al.

(10) Patent No.: US 7,698,641 B2
(45) Date of Patent: Apr. 13, 2010

(54) DISPLAY APPARATUS, DISPLAY SYSTEM, AND AUTHENTICATING METHOD FOR USING DISPLAY APPARATUS

(75) Inventors: Hong-jae Kim, Suwon-si (KR); Young-jin Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 620 days.

(21) Appl. No.: 11/383,259

(22) Filed: May 15, 2006

(65) Prior Publication Data

US 2006/0288410 A1 Dec. 21, 2006

(30) Foreign Application Priority Data

Jun. 1, 2005 (KR) .................. 10-2005-0046793

(51) Int. Cl.
*G06F 15/00* (2006.01)
*G06F 13/00* (2006.01)

(52) U.S. Cl. ........................ 715/700; 715/736
(58) Field of Classification Search ......... 715/763–765, 715/856, 863, 719–721, 736; 345/156, 161
See application file for complete search history.

(56) References Cited

U.S. PATENT DOCUMENTS

| | | | |
|---|---|---|---|
| 2003/0009537 A1* | 1/2003 | Wang | 709/219 |
| 2006/0170958 A1* | 8/2006 | Jung et al. | 358/1.15 |

FOREIGN PATENT DOCUMENTS

| | | |
|---|---|---|
| CN | 1385787 | 12/2002 |
| CN | 1581944 | 2/2005 |
| JP | 2000-201143 | 7/2000 |
| JP | 2002-222172 | 8/2002 |
| JP | 2002-341844 | 11/2002 |
| JP | 2002-358138 | 12/2002 |
| JP | 2003-223307 | 8/2003 |
| JP | 2004-295558 | 10/2004 |
| WO | WO03/040896 | 5/2003 |

OTHER PUBLICATIONS

PCT Search Report dated Oct. 17, 2006 issued in PCT/KR2006/002099.
Chinese Office Action dated Sep. 19, 2008 issued in CN 200610092345.

* cited by examiner

*Primary Examiner*—Cao (Kevin) Nguyen
(74) *Attorney, Agent, or Firm*—Stanzione & Kim, LLP (57) ABSTRACT

A display apparatus includes a display on which an image is displayed, an interface feasible to communicate with an image source and to receive identification information of an authentication device, which is disposed on the image source and includes the identification information, from the image source, a data storage in which at least one registration-recognition information is saved, and a controller to decide whether to display the image corresponding to an image signal received from the image source on the display based on a determination of whether the identification information received through the interface is consistent with the registration-recognition information saved in the data storage.

24 Claims, 5 Drawing Sheets

DISPLAY APPARATUS, DISPLAY SYSTEM, AND AUTHENTICATING METHOD FOR USING DISPLAY APPARATUS

CROSS-REFERENCE TO RELATED APPLICATIONS

This application claims priority from Korean Patent Application No. 2005-0046793, filed on Jun. 1, 2005, in the Korean Intellectual Property Office, the disclosure of which is incorporated herein by reference in its entirety.

BACKGROUND OF THE INVENTION

1. Technical Field

The present general inventive concept relates to a display apparatus having an antitheft function, a display system usable with the display apparatus, and an authenticating method of performing the antitheft function using the display apparatus.

2. Description of the Related Art

Generally, a display apparatus has been used widely, such as for a computer monitor, TV, or the like. The display apparatus processes an image signal inputted from an image source like a computer, DVD, and the like, and displays the image signal as an image on a screen. Alternatively, the display apparatus receives a broadcasting signal and processes it as an image.

Conventionally, a cathode Ray tube ("CRT") display apparatus has been used widely. However, a liquid crystal display ("LCD") apparatus, which is slim, has been used widely in monitors, TVs, and the like. Furthermore, a plasma display panel ("PDP") apparatus and an organic light emitting device ("OLED") have been used widely in various fields.

A flat display apparatus, such as an LCD, a PDP, and the like, is slim and light as compared to the CRT display apparatus, and thus is easier to thieve.

Accordingly, an antitheft function can be added to the display apparatus including the monitor. For example, it is proposed that a window for inputting a password is popped up on the monitor's screen when the display apparatus is powered on, and the screen is normally displayed only when an entered password is consistent with an established password.

Thus, if the display apparatus is thieved, a user who does not know the password cannot use the display apparatus, thereby discouraging the theft of the display apparatus before the theft occurs.

However, the above-mentioned method has disadvantages. For example, the user must input the password whenever the user powers on the display apparatus.

SUMMARY

Accordingly, an aspect of the present general inventive concept provides a display apparatus, a display system, and an authenticating method for using the display apparatus having an antitheft function that takes into consideration a user's convenience.

Additional aspects and advantages of the present general inventive concept will be set forth in part in the description which follows and, in part, will be obvious from the description, or may be learned by practice of the general inventive concept.

The foregoing and/or other aspects of the present general inventive concept can be achieved by providing a display apparatus that includes a display on which an image can be displayed, comprising an interface feasible to communicate with an image source and to receive an identification information of an authentication device, which is disposed on the image source and comprises the identification information to discriminate devices which perform same function, from the image source, a data storage to save registration-recognition information, and a controller to decide whether to display the image corresponding to an image signal received from the image source on the display based on a determination of whether the identification information received through the interface is consistent with the registration-recognition information saved in the data storage.

The authentication device of the image source may include a network module to connect to a network. Furthermore, the identification information may include a MAC address of the network module.

The display apparatus may further comprise a GUI generator to display an authentication graphic user interface on the display. The controller may control the GUI generator to display the authentication graphic user interface on the display if the identification information is not consistent with the registration-recognition information, and may control the image signal received from the image source to display the image on the display if an input password inputted through the authentication graphic user interface is consistent with an established password.

The controller may save the identification information received from the image source as the registration-recognition information in the data storage if an input password is consistent with an established password. The controller may determine that the identification information is not consistent with the registration-recognition information if the identification information is not received through the interface.

The foregoing and/or other aspects of the present general inventive concept may also be achieved by providing a display system comprising an image source and a display apparatus. The image source may include a source interface, an image output part to output an image signal through the source interface, an authentication device that includes identification information to discriminate devices that perform the same function, and an identification information output part to output the identification information of the authentication device through the source interface. The display apparatus may include a display on which an image can be displayed, a display interface connected with the source interface to communicate and receive the image signal from the image source, a data storage in which registration-recognition information is saved, and a controller to decide whether to display the image signal received from the display interface on the display based on a determination of whether the identification information received through the display interface is consistent with registration-recognition information saved in the data storage.

The authentication device may include a network module to connect to a network. Furthermore, the identification information may include a MAC address of the network module.

The display apparatus may further include a GUI generator to display an authentication graphic user interface on the display. The controller may control the GUI generator to display the authentication graphic user interface on the display if the identification information is not consistent with the registration-recognition information, and may control the image signal received from the image source to be displayed on the display if an input password inputted through the authentication graphic user interface is consistent with an established password.

The controller may save the identification information received from the image source as the registration-recognition information in the data storage if an input password is consistent with an established password. The controller may determine that the identification information is not consistent with the registration-recognition if the identification information is not received through the interface.

The foregoing and/or other aspects of the present general inventive concept may also be achieved by providing an authenticating method for using a display apparatus connected to an image source, which includes an authentication device that includes identification information to discriminate predetermined devices that perform same function. The authentication method may include establishing registration-recognition information, sensing whether identification information of the authentication device is received from the image source, determining whether the received identification information is consistent with registration-recognition information, and deciding whether to display an image signal received from the image source based on the determination whether the received identification information is consistent with the registration-recognition information.

The authentication device may include a network module to connect the image source to a network, and the identification information may include a MAC address of the network module.

The authentication method may further include displaying an authentication graphic user interface if the identification information is not consistent with the registration-recognition information, determining whether an input password inputted through the authentication graphic user interface is consistent with an established password, and displaying the image signal received from the image source if the input password is consistent with the established password.

The establishing of the registration-recognition information may include establishing the identification information received from the image source as the registration-recognition information if the input password is consistent with the established password.

The authentication method may further include determining that identification information is not consistent with registration-recognition information if the identification information is not sensed as received from the image source.

The foregoing and/or other aspects of the present general inventive concept may also be achieved by providing a display apparatus that includes a display on which an image is displayed, comprising an interface feasible to communicate with an image source; a data storage in which at least a first registration password and a second registration password are saved, a GUI generator to display an authentication graphic user interface on the display, and a controller to control the GUI generator to display the authentication graphic user interface on the display if a first input password received through the interface from the image source is not consistent with one of the first registration passwords saved in the data storage, and deciding to display the image corresponding to an image signal received from the image source on the display based on whether a second input password inputted through the authentication graphic user interface is consistent with one of the second registration passwords saved in the data storage.

The first input password may include a MAC address of the image source.

The controller may control the image signal received through the interface to be displayed on the display if the first input password received through the interface from the image source is consistent with one of the first registration passwords when the controller is powered on. Furthermore, the controller may save the first input password received from the image source as the first registration password in the data storage if the second input password is consistent with the second registration password. In addition, the controller may determine that the first input password is not consistent with the first registration password if the first input password is not received through the interface.

The foregoing and/or other aspects of the present general inventive concept may also be achieved by providing a display apparatus that includes a display to display an image thereon, an interface to receive an image signal from an external image source and to receive identification information of the external image source from the external image source, and a controller to control the display to display the image corresponding to the image signal based on the received identification information and registration-recognition information.

The display apparatus may further include a data storage to store the registration-recognition information. The controller may control the display based on a determination of whether the received identification information and the registration-recognition information are the same. Furthermore, the controller may control the display based on the received identification information, the registration-recognition information, and second registration-recognition information.

In addition, the display apparatus may further include a data storage to store the registration-may control the display based on a determination of whether the received identification information is the same as one of the registration-recognition information and the second registration-recognition information.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
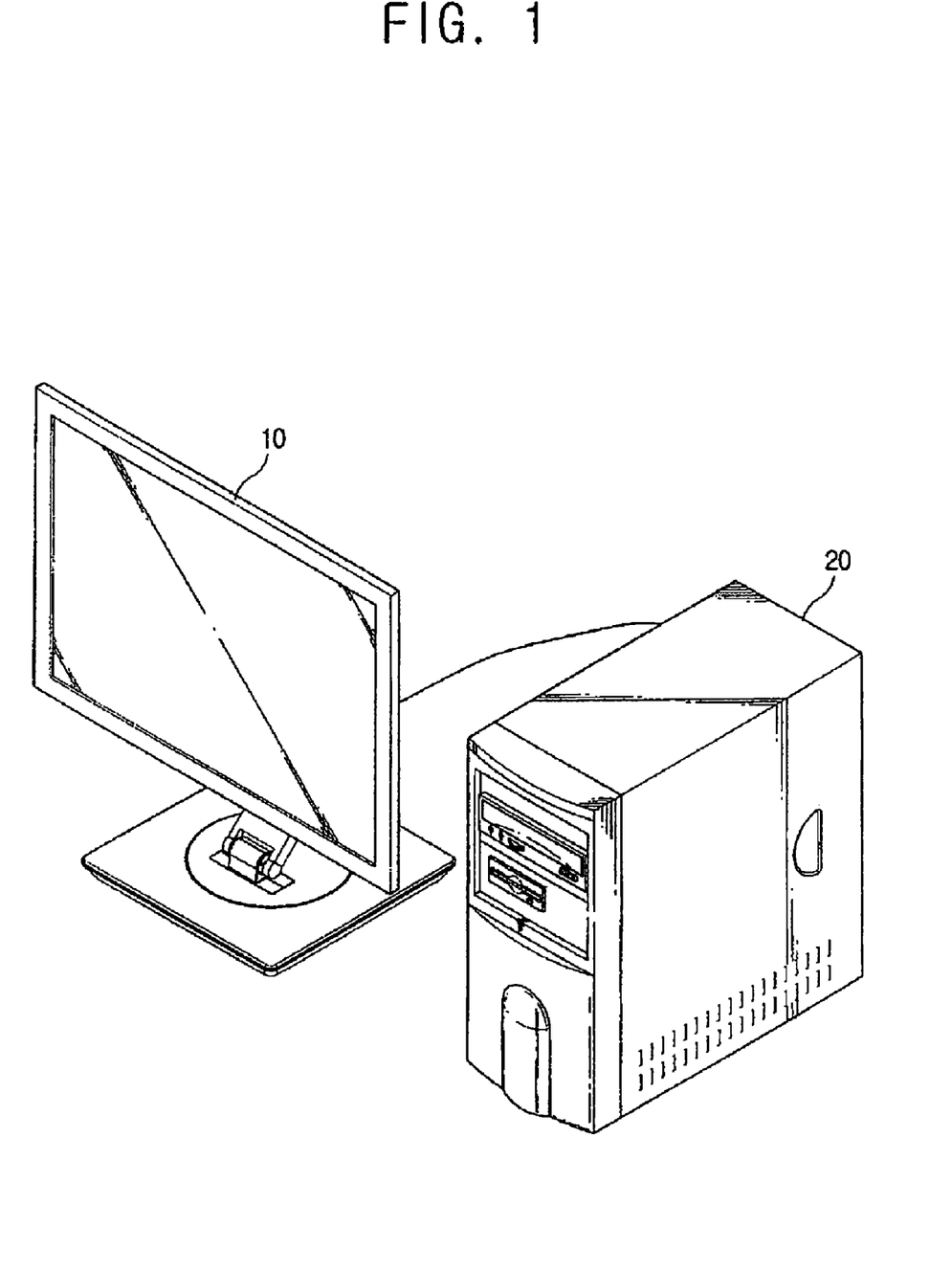
FIG. 1 is a drawing illustrating a display system according to an embodiment of the present general inventive concept.
Figure 2:
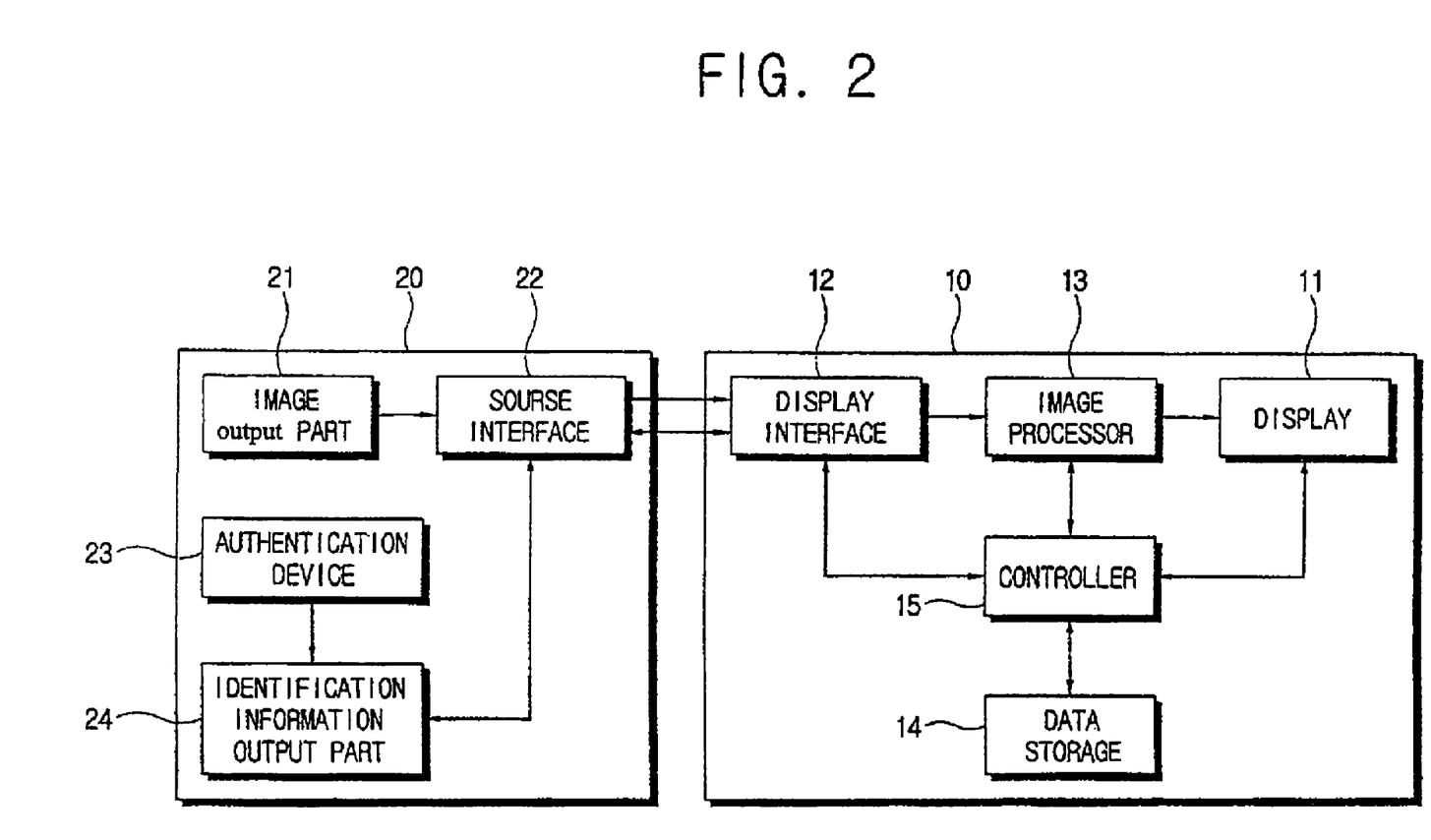
FIG. 2 is a control block diagram illustrating the display system of FIG. 1.

A display system, as illustrated in FIGS. 1 and 2, may include a display apparatus 10 and an image source 20. As illustrated in FIG. 1, a computer may be used as the image source 20 according to the present embodiment.

The image source 20 may include a source interface 22, an image output part 21, a authentication device 23, and an identification information output part 24.

The source interface 22 may be connected to a display interface 12 of the display apparatus 10 to communicate between the image source 20 and the display apparatus 10. The image output part 21 outputs an image signal to the display apparatus 10 through the source interface 22.

The authentication device 23 performs a specific function when the image source 20 operates. It is possible that the display apparatus 10 may be connected to a plurality of image sources 20, each of which may include authentication devices 23. The authentication device 23 of one or more of the plurality of image sources 20 may include identification information that classifies a plurality of devices performing identical functions. That is, the devices for authentication 23 respectively provided in a plurality of the image sources 20 have separate identification information. For example, the authentication device 23 may be a network module 23a to connect the image source 20 to a network and the identification information of the authentication device 23 may be a MAC address of the network module 23a.

The identification information output part 24 detects the identification information of the authentication device 23 and outputs the identification information of the authentication device 23 to the display apparatus 10 through the source interface 22.

Figure 3:
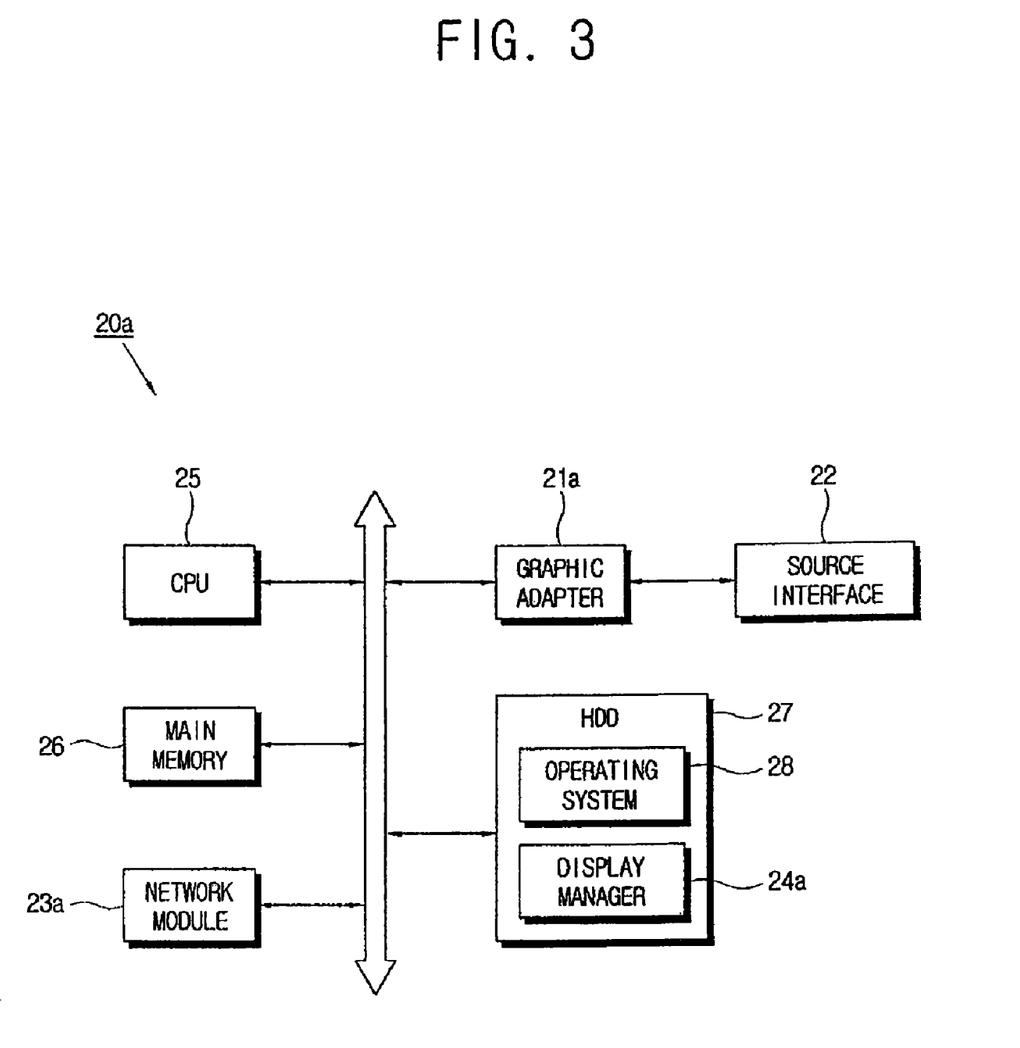
FIG. 3 is a control block diagram illustrating an image source of the display system of FIGS. 1 and 2.

Referring to FIGS. 2 and 3, a computer may be used as the image source 20a and a network module 23a may be used as the authentication device 23.

When the image source 20 is a computer, the computer may include a central processing unit 25 ("CPU"), a main memory 26, a graphic adapter 21a, a network module 23a, and a hard disk drive 27 ("HDD"). An operating system 28 of the computer, a display manager 24a, and at least one application program to be performed based on the operating system 28 may be saved in the HDD 27.

A graphic adapter 21a converts an image generated by mutual operation of the operating system 28, the CPU 25, the main memory 26, and the application program to an image signal to be outputted to a display 11. The graphic adapter 21a outputs the converted image signal to the display apparatus 10 through the source interface 22. The image output part 21 of the image source 20a may be configured to output the image signal through the source interface 22 among the graphic adapter 21a, the operating system 28, the CPU 25, the main memory 26, and the application program.

The network module 23a may be connected to the network and transmits/receives data. The network module 23a may have its own MAC address and may be connected to the network based on the MAC address.

The display manager 24a may operate based on the operating system 28. Furthermore, the display manager 24a may function as the identification information output part 24 in FIG. 2 provided with the MAC address from the network module 23a and to provide information on the MAC address of the network module 23a to the display apparatus 10 through the source interface 22. The display manager 24a may provide the information on the MAC address of the network module 23a to the display apparatus 10 periodically or by request of the display apparatus 10 through the source interface 22.

The display manager 24a may generate a graphic user interface so that a controller 15 of the display apparatus 10 may control a display condition of the image displayed on the display apparatus 10 and may provide a graphic user interface to the display apparatus 10. In addition, the display manager 24a may output a control signal corresponding to a user's input by a keyboard or a mouse through the graphic user interface to the display apparatus 10 through the source interface 22.

The source interface 22 is connected to a display interface 12 of the display apparatus 10 to communicate between the image source 20 and the display apparatus 10. The source interface 22 may include an image connector supporting a DDC-CI function, which connects the computer and the display apparatus 10. The DDC-CI may function to prescribe a signal line and a procedure for data exchange between the computer and the display apparatus 10, such as by a standard provided by Video Electronics Standard Association ("VESA") in order to realize an automatic set-up, called plug-and-play, in the computer system. The image signal may be output to the display apparatus 10 through the source interface 22, and the information on the MAC address may also be output to the display apparatus 10 through the source interface 22.

As further illustrated in FIG. 2, the display apparatus 10 may include the display 11, an image processor 13, a display interface 12, a data storage 14, and a controller 15.

In embodiments, the display 11 displays an image corresponding to the image signal from the image processor 13. The display 11 may be, but is not limited to, a CRT, an LCD, a PDP, and the like.

The image processor 13 may convert the image signal received through the display interface 12 to a format that the display 11 may display, and may output the image signal to the display 11.

A format feature or function of the image processor 13 may vary according to one or more formats of the image signal received through the display interface 12, and/or according to one or more types of the displays 11. The image processor 13 may include a scaler to scale the image signal and to convert a vertical frequency, a resolution, and a ratio of a screen of the image signal to be suitable for an outputting standard of the display 11. In addition, the image processor 13 may include an A/D converter to convert the image signal to correspond to a format of the image signal received through the display interface 12 to a digital R,G,B signal, which the scaler may process. Furthermore, the image processor 13 may include a signal converter that includes at least one of a video decoder and a tuner.

The display interface 12 may be connected to the source interface 22 of the image source 20a, and may receive the image signal and the identification information that are output from the image source 20a. The display interface 12, like the image source 20a, may include the image connector to support a DDC-CI function to connect the computer and the display apparatus 10.

Registration-recognition information may be saved in the data storage 14. The registration-recognition information may be established and saved by the user or a manufacturer, or may be automatically registered through a registration process.

The controller 15 may control the image processor 13 and the display 11 so that the image signal received through the display interface 12 passes through the image processor 13 and is displayed in the image through the display 11.

In addition, the controller 15 may sense whether the identification information is received through the display interface 12, and may decide whether to display the image signal received from the image source 20a of the display 11 based on whether the received identification information is consistent with registration-recognition information in the data storage 14.

Figure 4:
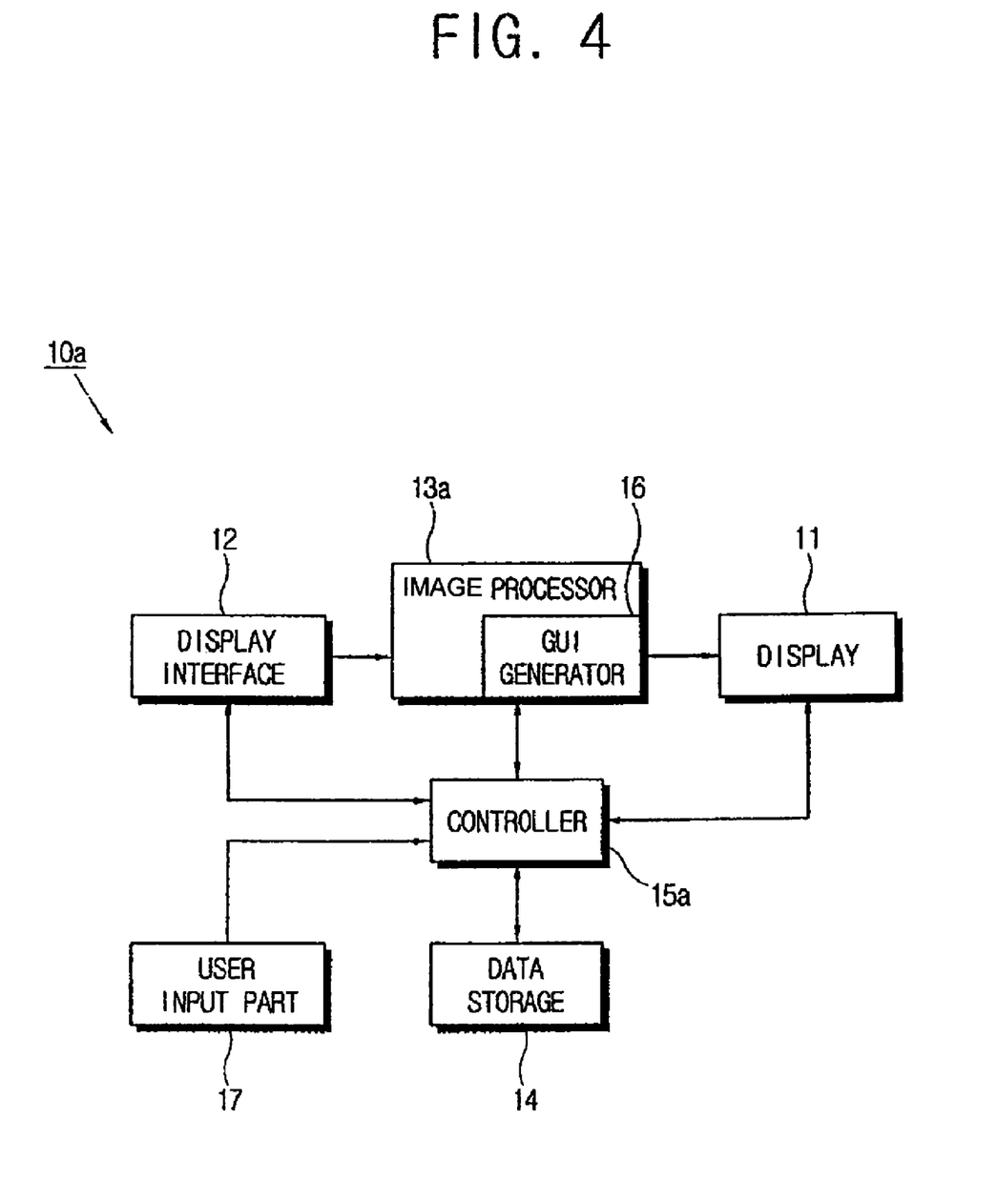
FIG. 4 is a control block diagram illustrating a display apparatus of the display system of FIGS. 1 and 2.

A display apparatus 10a, as illustrated in FIG. 4, may include the display 11, the image processor 13, the display interface 12, the data storage 14, and the controller 15a. Moreover, the display apparatus 10a may further include a GUI generator 16 to display the graphic user interface on the display 11 and a user input part 17.

As mentioned above, the controller 15a may sense whether the identification information is received through the display interface 12 and may decide whether to display the image signal received from the image source 20a of the display 11 based on whether the received identification information is consistent with registration-recognition information in the data storage 14.

The controller 15a may control the GUI generator 16 to display an authentication graphic user interface on the display 11 when the identification information received through the display interface 12 is not consistent with any registration-recognition information in the data storage 14.

Furthermore, when a user inputs an input password through the authentication graphic user interface using the user input part 17, the controller 15a may determine whether the input password is consistent with an established password. Here, the established password may be saved in the data storage 14.

If the input password is consistent with the established password, the controller 15a may control the image processor 13 and the display 11 so that the image signal received through the display interface 12 from the image source 20a is displayed in the image on the display.

Likewise, as for authentication for using the display apparatus 10a, the controller 15a may receive a first password, which is the identification information, from the image source 20a and may decide whether to authenticate the first password. The controller may also use a second password, which the user inputs if the authentication by the first password fails. Thus, a user's convenience is promoted while efficient authentication for using the display apparatus 10a is realized.

The controller 15a may save the identification information of the image source 20a received through the display interface 12 as new registration-recognition information in the data storage 14 if the input password is consistent with the established password. Furthermore, the controller 15a may decide whether to display the image only by comparing the identification information and the registration-recognition information while the image source 20a is connected. As a result, a user does not need to input the password, thereby promoting the user's convenience while performing the authentication for using the display apparatus 10a.

However, if the input password is not consistent with the established password, the controller 15a may control the image signal received through the display interface 12 so that the image signal is not normally displayed on the display 11. For example, the controller 15a may control the GUI generator 16 so that a predetermined error message is displayed on the display 11, or may abnormally adjust the resolution of the image signal, the size of the image signal, and the like, thereby damaging the image displayed on the display 11. Furthermore, the controller 15a may re-ask for the input password when the input password is not consistent with the established password.

Figure 5:
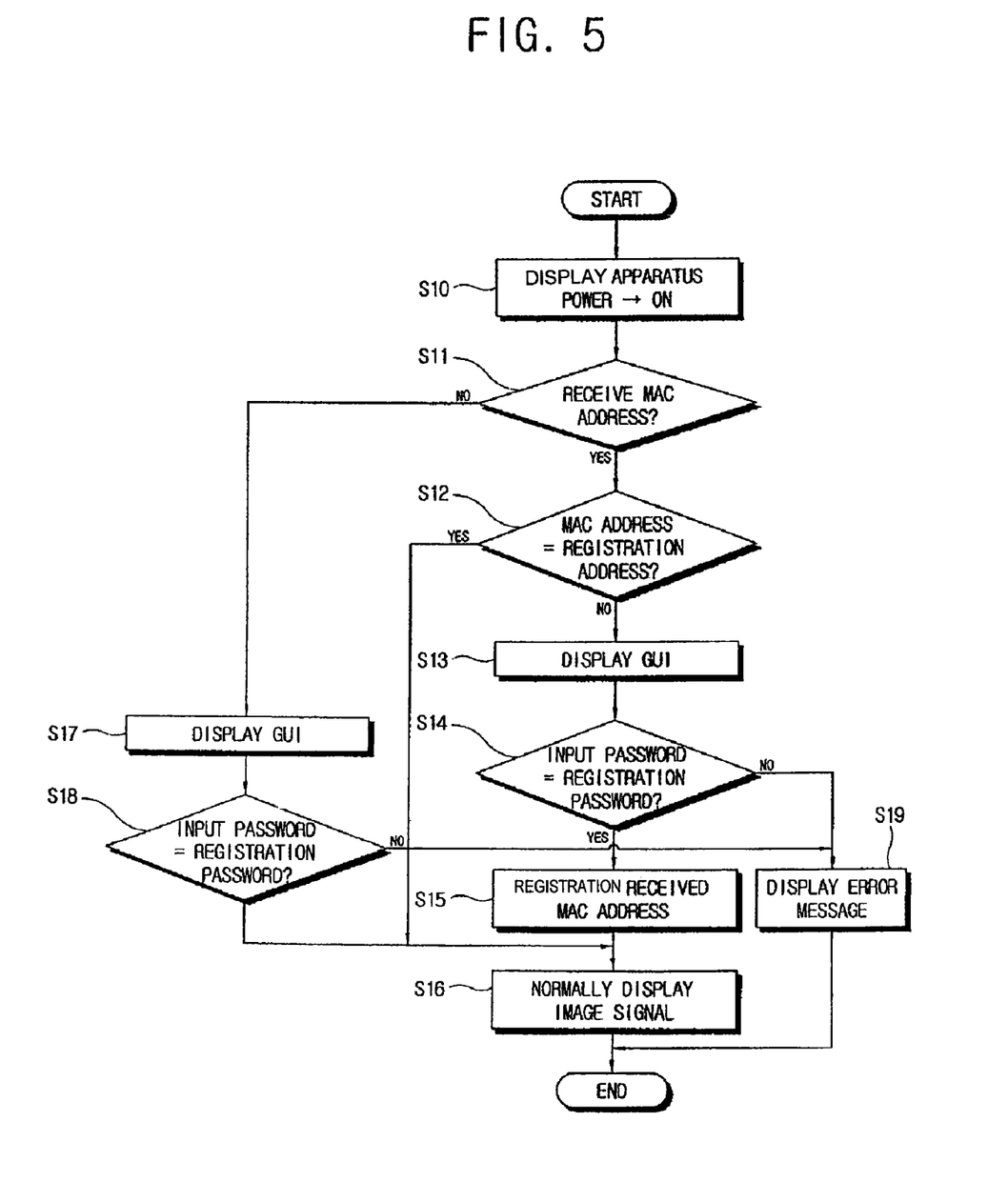
FIG. 5 is a control flow chart illustrating an authenticating method of a display system using a display apparatus according to an embodiment of the present general inventive concept

FIG. 5 illustrates an authenticating method for using a display apparatus 10a. As illustrated in FIG. 5, the MAC address may be used as the identification information, and the registration address corresponding to the MAC address may be used as the registration-recognition information saved in the data storage 14 of the display apparatus 10.

FIGS. 3 and 4 illustrate the image source 20a and the display apparatus 10a. As illustrated in FIGS. 3 and 4, when the display apparatus 10a is powered on while the display apparatus 10a is connected to the image source 20a and the image source 20a is powered on, at operation S10, the controller 15a of the display apparatus 10a may sense whether to receive the MAC address through the display interface 12, at operation S11.

When the MAC address is received through the display interface 12 from the image source 20a, the controller 15a may determine whether the MAC address is consistent with the registration address in the data storage 14, at operation S12. If the received MAC address is not consistent with the registration address, the controller 15a may control the GUI generator 16 to display the authentication graphic user interface on the display 11, at operation S13.

Furthermore, the controller 15a may determine whether the input password input through the authentication graphic user interface is consistent with the registration password in the data storage 14, at operation S14. If the input password is consistent with the registration password, the controller 15a may save the received MAC address as a new registration password in the data storage 14, at operation S15, and may control the image processor 13 and the display 11 so that the image signal received through the display interface 12 is normally displayed on the display 11, at operation S14.

However, if the input password is not consistent with the registration password in operation S14, the controller 15a may control the image signal received through the display interface 12 so that it is not normally displayed on the display 11, such as by displaying an error message or the like.

If determining the MAC address is determined to be consistent with the registration address, the controller 15a may control the image processor 13 and the display 11 so that the image signal received through the display interface 12 is displayed on the display 11 without an additional user authentication, at operation S16.

If the MAC address is not received through the display interface 12 from the image source 20a in operation S11, the controller 15a may control the GUI generator 16 to display the authentication graphic user interface on the display 11, as the MAC address is determined to be inconsistent with the registration address, at operation S17.

The controller 15a may then determine whether the input password input through the authentication graphic user interface is consistent with the registration password in the data storage 14, at operation S18. If the input password is consistent with the registration password, the controller 15a may control the image processor 13 and the display 11 so that the image signal received through the display interface 12 is normally displayed on the display 11, at operation S16.

However, if the input password is not consistent with the registration password in operation S18, the controller 15a may control the image signal received through the display interface 12 so that it is not normally displayed on the display 11, such as by displaying an error message or the like.

Although a computer is given an example of an image source 20a, any image source 20a that includes the authentication device 23 or the network module 23a may be included in the image source 20a, which is connected to the display apparatus 10a to apply the image signal thereto. Thus, the image source 20a is not limited to being a computer.

In addition, although a MAC address is given an example of an identification information of the image source 20a, any information included in the authentication device 23 to discriminate between devices that perform identical functions, such as serial numbers of products, IRQ value allotted to specific components in case of a computer or the like, may be used as the identification information of the image source 20a. Thus, the identification information is not limited to being a MAC address.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A display apparatus, comprising:
    a display to display an image;
    an interface to communicate with an image source and to receive an identification information of an authentication device disposed on the image source;
    a data storage to save registration-recognition information to the display; and
    a controller to decide whether to display the image corresponding to an image signal received from the image source on the display based on a determination of whether the identification information received through the interface is consistent with the registration-recognition information saved in the data storage.

2. The display apparatus according to claim 1, wherein the authentication device comprises a network module connected to a network and the identification information comprises a MAC address of the network module.

3. The display apparatus according to claim 1, further comprising:
    a GUI generator to display an authentication graphic user interface on the display,
    wherein the controller controls the GUI generator to display the authentication graphic user interface on the display if the identification information is not consistent with the registration-recognition information, and controls the image signal received from the image source to display the image on the display if an input password input through the authentication graphic user interface is consistent with an established password.

4. The display apparatus according to claim 3, wherein the controller saves the identification information received from the image source as the registration-recognition information in the data storage when the input password is consistent with the established password.

5. The display apparatus according to claim 4, wherein the controller determines that the identification information is not consistent with the registration-recognition information when the identification information is not received through the interface.

6. A display system comprising:
    an image source comprising a source interface, an image output part to output an image signal through the source interface, an authentication device comprising identification information to discriminate between devices performing identical functions, and an identification information output part to output the identification information of the authentication device through the source interface; and
    a display apparatus comprising a display to display an image, a display interface connected with the source interface to communicate with the image source and receive the image signal from the image source, a data storage to save registration-recognition information to the display apparatus, and a controller to decide whether to display the image corresponding to the image signal received from the display interface on the display based on a determination of whether the identification information received through the display interface is consistent with registration-recognition information saved in the data storage.

7. The display system according to claim 6, wherein the authentication device comprises a network module connected to a network and the identification information comprises a MAC address of the network module.

8. The display system according to claim 6, wherein:
    the display apparatus further comprises a GUI generator to display an authentication graphic user interface on the display; and
    the controller controls the GUI generator to display the authentication graphic user interface on the display if the identification information is not consistent with the registration-recognition information, and controls the image signal received from the image source to display the image on the display if an input password input through the authentication graphic user interface is consistent with an established password.

9. The display system according to claim 8, wherein the controller saves the identification information received from the image source as the registration-recognition information in the data storage when the input password is consistent with the established password.

10. The display system according to claim 9, wherein the controller determines that the identification information is not consistent with the registration-recognition when the identification information is not received through the interface.

11. An authenticating method using a display apparatus connected to an image source comprising an authentication device comprising identification information, the method comprising:
    establishing registration-recognition information on the display apparatus;
    sensing whether to receive the identification information of the authentication device from the image source;
    determining whether the received identification information is consistent with registration-recognition information; and
    deciding whether to display an image corresponding to an image signal received from the image source based on the determination of whether the received identification information is consistent with registration-recognition information.

12. The authentication method according to claim 11, wherein the authentication device comprises a network module connecting the image source to a network, and the identification information comprises a MAC address of the network module.

13. The authentication method according to claim 11, further comprising:
    displaying an authentication graphic user interface if the identification information is not consistent with the registration-recognition information;
    determining whether an input password input through the authentication graphic user interface is consistent with an established password; and
    displaying the image signal received from the image source when the input password is consistent with the established password.

14. The authentication method according to claim 13, wherein the establishing of the registration-recognition information comprises establishing the identification information received from the image source as the registration-recognition information when the input password is consistent with the established password.

15. The authentication method according to claim 11, further comprising:
  determining that the identification information is not consistent with the registration-recognition information when the identification information is not sensed as received.

16. A display apparatus, comprising:
  a display to display an image,
  a display interface to communicate with an image source;
  a data storage to save at least a first registration password and a second registration password to the display;
  a GUI generator to display an authentication graphic user interface on the display; and
  a controller to control the GUI generator to display the authentication graphic user interface on the display when a first input password received through the interface from the image source is not consistent with the first registration password saved in the data storage, and to decide whether to display an image signal received from the image source on the display based on a determination of whether a second input password input through the authentication graphic user interface is consistent with the second registration password saved in the data storage.

17. The display apparatus according to claim 16, wherein the first input password comprises a MAC address of the image source.

18. The display apparatus according to claim 16, wherein the controller controls the image signal received through the interface to be displayed on the display when the first input password received through the interface from the image source is consistent with one of the first registration passwords.

19. The display apparatus according to claim 16, wherein the controller saves the first input password received from the image source as the first registration password in the data storage when the second input password is consistent with the second registration password.

20. The display apparatus according to claim 19, wherein the controller determines that the first input password is not consistent with the first registration password when the first input password is not received through the interface.

21. A display apparatus, comprising:
  a display to display an image thereon;
  an interface to receive an image signal from an external image source and to receive identification information of the external image source from the external image source; and
  a controller to control the display to display the image corresponding to the image signal based on the received identification information and registration-recognition information on the display.

22. The display apparatus according to claim 21, further comprising:
  a data storage to store the registration-recognition information,
  wherein the controller controls the display based on a determination of whether the received identification information and the registration-recognition information are the same.

23. The display apparatus according to claim 21, wherein:
  the controller controls the display based on the received identification information, the registration-recognition information, and second registration-recognition information.

24. The display apparatus according to claim 23, further comprising:
  a data storage to store the registration-recognition information and the second registration-recognition information,
  wherein the controller controls the display based on a determination of whether the received identification information is the same as one of the registration-recognition information and the second registration-recognition information.

* * * * *